United States Patent
Svedman

(10) Patent No.: US 11,240,848 B2
(45) Date of Patent: Feb. 1, 2022

(54) RANDOM ACCESS CONFIGURATIONS

(71) Applicants: ZTE Wistron Telecom AB, Kista (SE); ZTE (TX) INC., Austin, TX (US)

(72) Inventor: Patrick Svedman, Kista (SE)

(73) Assignees: ZTE WISTRON TELECOM AB, Kista (SE); ZTE (TX) INC., Austin, TX (US)

(*) Notice: Subject to any disclaimer, the term of this patent is extended or adjusted under 35 U.S.C. 154(b) by 0 days.

(21) Appl. No.: 16/346,844

(22) PCT Filed: Jan. 5, 2018

(86) PCT No.: PCT/US2018/012639
§ 371 (c)(1),
(2) Date: May 1, 2019

(87) PCT Pub. No.: WO2018/129357
PCT Pub. Date: Jul. 12, 2018

(65) Prior Publication Data
US 2019/0320468 A1    Oct. 17, 2019

Related U.S. Application Data

(60) Provisional application No. 62/442,811, filed on Jan. 5, 2017.

(51) Int. Cl.
*H04W 74/08* (2009.01)
*H04B 17/336* (2015.01)
(Continued)

(52) U.S. Cl.
CPC ...... *H04W 74/0833* (2013.01); *H04B 17/336* (2015.01); *H04W 24/10* (2013.01); *H04W 56/001* (2013.01); *H04W 74/02* (2013.01)

(58) Field of Classification Search
None
See application file for complete search history.

(56) References Cited

U.S. PATENT DOCUMENTS

2008/0232329 A1* 9/2008 Jen ............... H04W 74/0866
370/335
2008/0279257 A1 11/2008 Vujcic et al.
(Continued)

FOREIGN PATENT DOCUMENTS

WO    2015147717 A1    10/2015
WO    2016195346 A1    12/2016

OTHER PUBLICATIONS

International Search Report in International Patent Application No. PCT/US18/12639, dated May 10, 2018, in 4 pages.
(Continued)

*Primary Examiner* — James P Duffy
(74) *Attorney, Agent, or Firm* — Duane Morris LLP

(57) ABSTRACT

A system and method for random access configurations are disclosed herein. In one embodiment, a method performed by a communication device includes: defining, based on a parameter for communication with a communication node, at least one of: a plurality of random access channel (RACH) groups, and a relationship between individual RACH groups of the plurality of RACH groups and measurement results; obtaining the measurement results from a plurality of signals; determining a matching RACH group from the plurality of RACH groups based on the measurement results; and sending a message using at least one resource of the matching RACH group.

30 Claims, 8 Drawing Sheets

(51) Int. Cl.
  *H04W 24/10*   (2009.01)
  *H04W 56/00*   (2009.01)
  *H04W 74/02*   (2009.01)

(56) References Cited

U.S. PATENT DOCUMENTS

| | | |
|---|---|---|
| 2010/0080135 A1 | 4/2010 | Ishii et al. |
| 2010/0278064 A1* | 11/2010 | Jeong .................. H04W 74/008 370/252 |
| 2011/0039499 A1 | 2/2011 | Zhang et al. |
| 2012/0077512 A1* | 3/2012 | Park .................. H04W 74/0866 455/452.1 |
| 2016/0192392 A1 | 6/2016 | Park et al. |
| 2018/0048375 A1* | 2/2018 | Guo ....................... H04B 7/024 |
| 2018/0139760 A1* | 5/2018 | Lee ....................... H04W 28/18 |
| 2019/0174554 A1* | 6/2019 | Deenoo .................. H04W 16/14 |

OTHER PUBLICATIONS

ZTE, ZTE Microelectronics, "Unified RACH procedure", 3GPP TSG RAN WG1 Meeting #87, R1-1611273, Reno, USA, Nov. 14-18, 2016, 9 pages.

* cited by examiner

RANDOM ACCESS CONFIGURATIONS

RELATED APPLICATIONS

This application is a 371 of International Application No. PCT/US2018/012639, filed on Jan. 5, 2018 which claims benefit of U.S. Provisional Application No. 62/442,811 entitled "RANDOM ACCESS CONFIGURATIONS" filed on Jan. 5, 2017, the contents of which are incorporated by reference herein in their entireties.

TECHNICAL FIELD

This disclosure relates generally to wireless communications and, more particularly, to systems and methods for random access.

BACKGROUND

Random access in wireless systems may be utilized to initiate and facilitate communication between user equipment (UE) with a network. This network may include a base station (BS) that the UE interacts with, and a core network or other network equipment and functions which may provide wireless communication services for the UE. For example, random access may enable a UE to extract timing and frequency (phase) information for timing synchronization and initial frequency correction.

Traditionally, random access may be performed in accordance with a four message random access procedure. This four message random access procedure may include multiple operations, which are numerated below for ease of explanation. For example, as a first operation, downlink signals (DL) may be broadcast by a network. These broadcasted signals may be periodically transmitted. Also, such broadcasted signals may include synchronization signal(s) (SS), reference signal(s) (RS), and broadcast channel(s) (BCH) that each carry system information (SI).

As a second operation, user equipment (UE) may receive the broadcasted signals from the system. The UE may use SS and RS for obtaining DL time/frequency synchronization information as discussed above. Furthermore, the UE may decode a BCH to obtain SI.

As a third operation, UEs in an IDLE state (e.g. as used in the Long Term Evolution (LTE) telecommunication standard), such as UEs accessing the network for the first time, may rely on the broadcasted signals and information therein to access the network (e.g., a BS in the network). However, UEs that have previously accessed the network may be in a CONNECTED state (e.g. as used in LTE). In a CONNECTED state, the UE may receive further UE-specific configuration information based on the broadcasted signals.

As a fourth operation, based on the received signals, the UE may select a random access channel (RACH) group for random access channel (RACH) preamble transmission. Further discussion of RACH groups and RACH resources are discussed, for example, in R1-1611273, "Unified RACH Procedure", ZTE, ZTE Microelectronics, November 2016, incorporated by reference herein in its entirety. A RACH group may be a combination of a set of RACH resources and a set of eligible RACH preambles. A RACH resource may be a time-frequency resource on which a RACH preamble may be transmitted. A RACH occasion or message 1 (MSG1) occasion may be a time instance on which a RACH preamble may be transmitted. Hence, a RACH resource may be a combination of a MSG1 occasion and frequency resources. By being eligible, RACH preambles may be among a set of RACH preambles that may be part of a RACH group. The set of eligible preambles may be predefined in some cases. The set of eligible preambles may be indicated in the SI in some cases. The set of eligible preambles can be indicated in a UE-specific configuration in some cases. Also, RACH groups may be disjoint (e.g., where a certain combination of a RACH resource and preamble is present in no more than one group). Different RACH groups may be selected depending on the received signals, for instance depending on SI. In some cases, the index of the best measurement result (e.g. with highest received power) may be used to select a RACH group. In some cases, the UE-specific configuration of a CONNECTED UE may configure the UE selection of a RACH group.

As a fifth operation, the UE may select a RACH resource belonging to the selected RACH group. The UE may also select a preamble for transmission on the selected RACH resource. The combination of the selected preamble and RACH resource may belong to the RACH group. Also, the RACH resource may be selected as the closest resource in time, in order to reduce the time delay until preamble transmission. Furthermore, the preamble may be selected randomly from a set of eligible preambles.

As a sixth operation, the UE may transmit the selected preamble on the selected RACH resource. Since the preamble is the first message in this random access procedure with four messages, it can also be referred to as MSG1.

As a seventh operation that is optional, in some cases, multiple preambles may be transmitted by the UE. In such cases, the fifth and sixth operations may be repeated, such that multiple preambles are transmitted on multiple different RACH resources. Stated another way, the seventh operation may represent a repeat of the fifth and sixth operations.

As an eighth operation, in response to a detected preamble, the network may transmit a random access response (RAR). As this is a second message of this four message random access procedure, the RAR may also be referred to as MSG2.

As a ninth operation, in response to a received MSG2, the UE may respond with a third message referred to as MSG3.

As a tenth operation, another message from the network to the UE may be transmitted and be referred to as MSG4.

In addition to the above referenced traditional four message random access procedure, some random access procedures may be referred to as two message random access procedures. These two message random access procedures may be an adaptation of the above referenced four message random access procedure by updating the sixth operation (referenced above) such that the UE transmits the selected preamble together with some data on the RACH resource. The data may include parts of MSG3 of the four message random access procedure (thereby combining MSG3 into MSG1). Also, the first message in the two message random access procedure may be referred to as MSG1_2.

Also, the two message random access procedures may include an adaptation of the above referenced four message random access procedure by updating the eighth operation (referenced above) to instead transmit a response message, that will be referred to as MSG2_2, from the network in response to a detected MSG1_2. This response may include parts of MSG2 and MSG4 in the four message random access procedure (thereby combining MSG4 into MSG2).

Accordingly, the ninth and tenth operations in the four message random access procedure need not be performed in two message random access procedures.

In contention-based random access, multiple UEs may use same RACH resources for random access. One example is IDLE mode UEs that all use a same configuration received from a same BCH. Consequently, there is a risk of collision (contention) between UEs in contention-based random access. A collision may occur when multiple UEs choose a same RACH occasion and preamble for transmission. The amount of RACH resources can be adapted to control the risk of collision.

In contention-free random access, a UE may be assigned a RACH resources such that there is (virtually) no risk of collision. In an LTE cell, this may be done by assigning a certain preamble to the UE that the other UEs may not use. This assignment may be done in a UE-specific configuration that is available only to a CONNECTED mode UE in LTE.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication device includes: defining, based on a parameter for communication with a communication node, at least one of: a plurality of random access channel (RACH) groups, and a relationship between individual RACH groups of the plurality of RACH groups and measurement results; obtaining the measurement results from a plurality of signals; determining a matching RACH group from the plurality of RACH groups based on the measurement results; and sending a message using at least one resource of the matching RACH group.

In a further embodiment, a method performed by a communication node includes: defining, based on a parameter for communication with a communication device, at least one of: a plurality of random access channel (RACH) groups, and a relationship between individual RACH groups of the plurality of RACH groups and measurement results from a plurality of signals; transmitting the plurality of signals; receiving a first message comprising a matching RACH group of the plurality of RACH groups; determining a matching signal of the plurality of signals based on the matching RACH group; and transmitting a second message using at least one resource of the matching signal.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
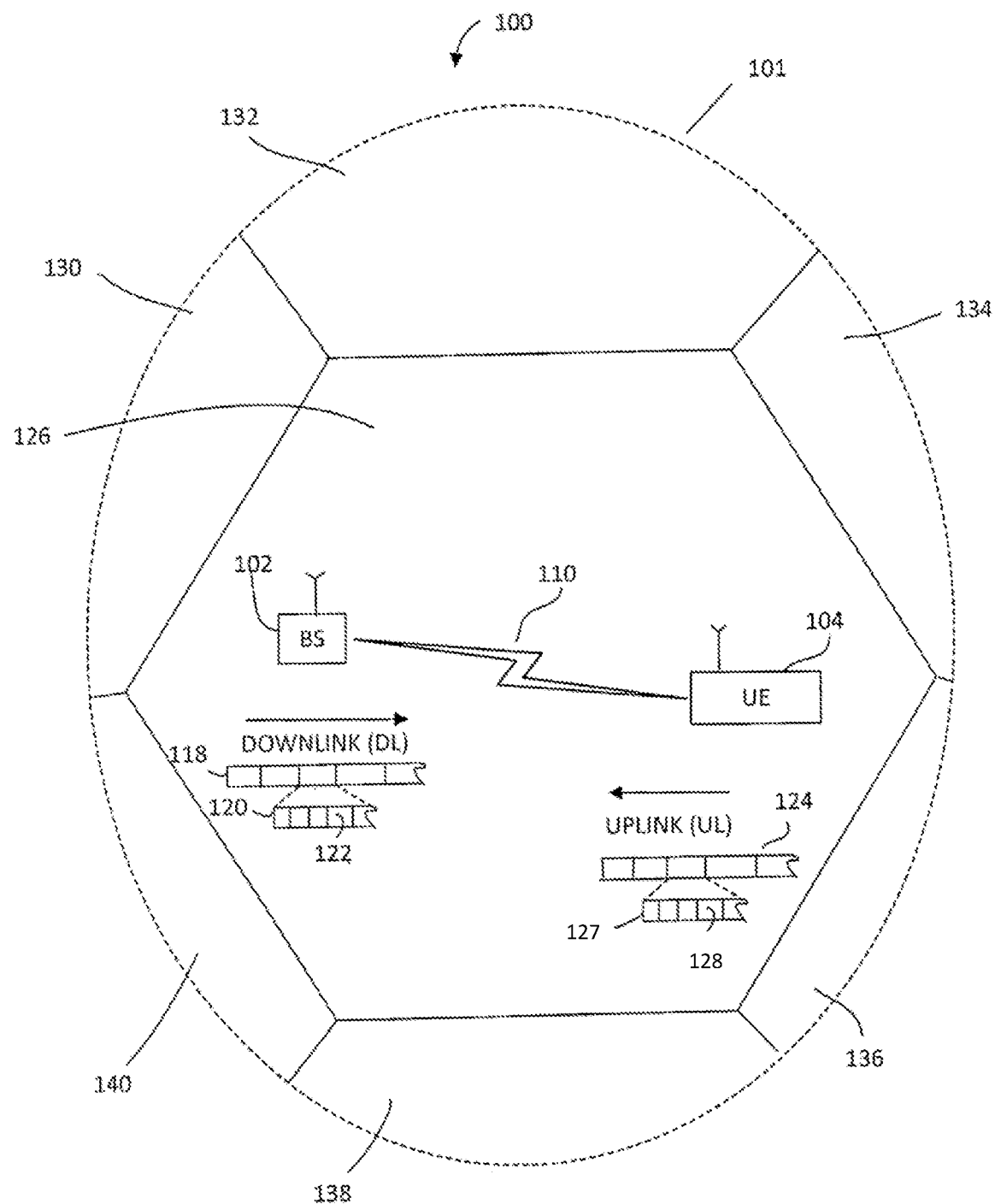
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. Such an exemplary network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. As introduced above, the UE 104 may undergo a random access procedure to join the network 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention. In certain embodiments, a communication node may refer specifically to a BS while a communication device may refer specifically to a UE.

Figure 2:
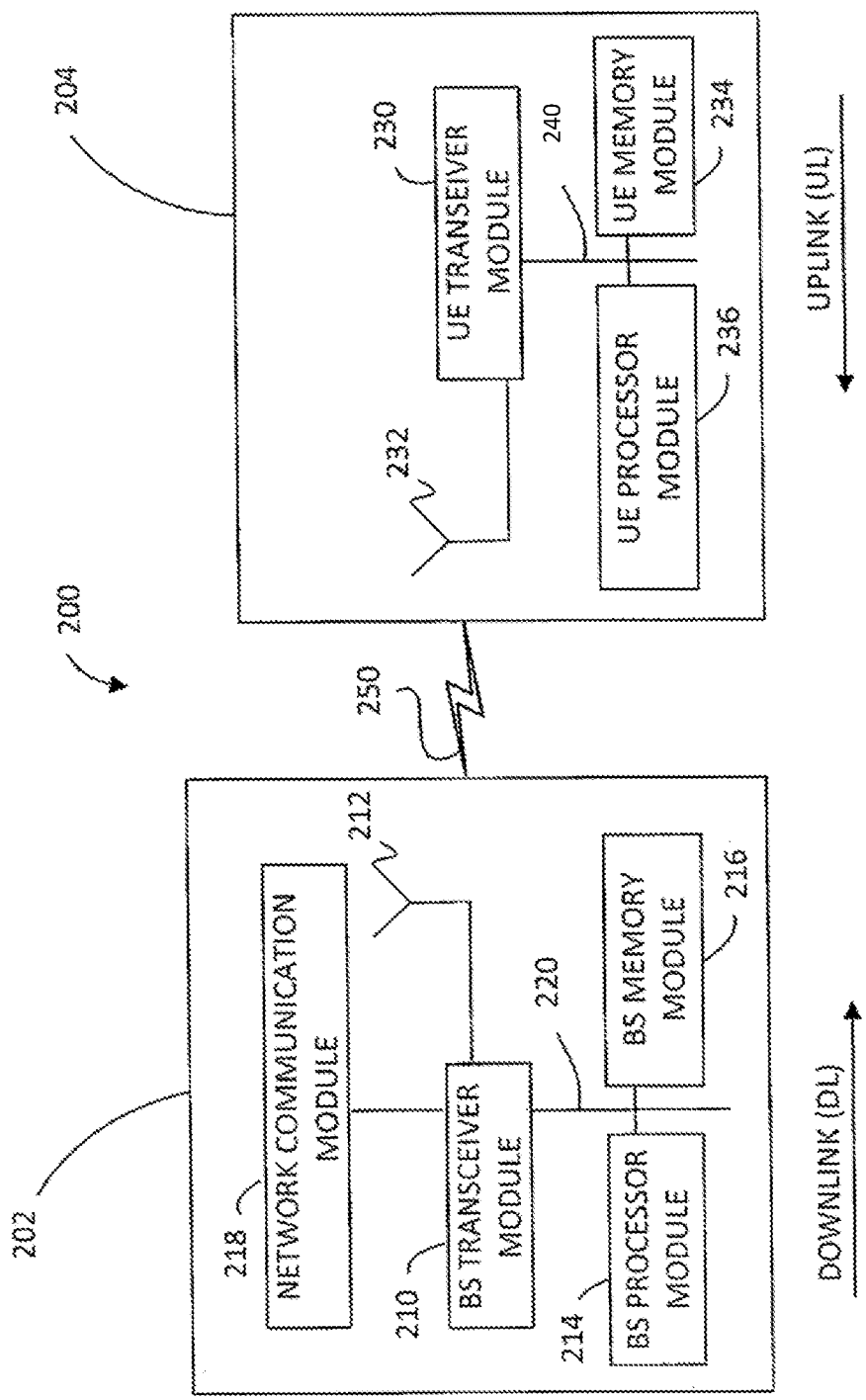
FIG. 2 illustrates block diagrams of an exemplary base station and a user equipment device, in accordance with some embodiments of the present disclosure.

FIG. 2 illustrates a block diagram of an exemplary wireless communication system 200 for transmitting and receiving wireless communication signals (e.g., OFDM/OFDMA signals) in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuity that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some exemplary embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

In certain embodiments, a UE may inform a network (e.g., specifically, a BS that the UE may communicate with to access the network) of results from the UE's measurements of signals broadcasted from the system for random access. As introduced above, a BS representing a network may broadcast signals such as a synchronization signal (SS), reference signal (RS), or broadcast channel (BCH) carrying system information (SI). The UE may perform measurements using these broadcast signals that may characterize how signals are being received at the UE. These characterizations may describe, for example, a signal strength for a beam used during a random access procedure, where a matching beam (e.g., a best beam) is a beam with a highest signal strength among beams received (e.g., signals broadcasted from the system for random access). As will be discussed further below, a matching measurement result may be a measurement result that best matches with a criteria, such as greatest signal strength or lowest noise. In some embodiments, the results from these measurements may be conveyed by the selection of a subset of RACH resources or in MSG3.

As introduced above the UE may perform measurements on signals transmitted by the network (e.g., downlink (DL) signals that are broadcast by the network). In some embodiments, the UE performs measurements (and/or other analysis as discussed further in connection with the second operation of the above referenced four or two message random access procedures) on signals broadcasted by the network (discussed further in connection with the first operation of the above referenced four or two message random access procedures).

In various embodiments, the UE may perform multiple measurements on random access DL signals (or measure multiple random access DL signals), resulting in multiple measurement results. Examples of measurement results include a reference signal (RS) received power (RSRP), reference signal (RS) received quality (RSRQ), signal to noise power ratio (SNR), signal to noise and interference power ratio (SINR) or other relevant metrics, in various embodiments.

The present disclosure provides various embodiments of systems and methods for random access configurations. These random access configurations may include flexible and efficient configurations of contention-based and/or contention-free random access in the context of systems employing association between measurement results and combinations of subsets of RACH resources and subsets of RACH preambles. Example systems where such mechanisms are relevant are when analog and/or hybrid beamforming are used. Additionally, both receiver/transmitter (Rx/Tx) reciprocity and no Rx/Tx reciprocity systems are supported, in accordance with some embodiments. The inclusion of contention-free random access in the association framework may also be addressed in various embodiments.

As described above, a UE may select a RACH group based on measurement results on a DL RS. For instance, the index of the best measurement result may be associated (mapped) to a RACH group.

Advantageously, flexible configurations of RACH groups may be utilized, for instance, to support different levels of BS reception/transmission (Rx/Tx or UL/DL) reciprocity (e.g., beam correspondence), especially when analog or hybrid beamforming are used. In some embodiments, the occurrence of a RACH group may be limited to a subset of the RACH resources and/or a subset of MSG1 occasions. In some embodiments, it may be beneficial to let the RACH groups occur in each RACH resource and/or MSG1 occasion.

A problem associated with providing a flexible definition of RACH groups (e.g., allowing configuration for a wide range of scenarios) is that such flexible definitions of RACH groups may be too complicated. Accordingly, various embodiments provide a simple yet flexible approach to configure RACH groups that avoids over complication.

Another problem concerns how to handle contention-free random access in systems with association between measurement results and RACH groups. For example, contention-free random access may be based on assigning a particular preamble index to a UE that may use any RACH resource. However, this approach may not work with the association and RACH group framework of certain systems, such as when there are multiple RACH groups defined per RACH resource.

Accordingly, RACH groups may be flexibility defined based how a UE interacts with a network. This may contrast with traditional RACH groups that may be predefined independent of any UE and/or network interactions. Also, a UE may obtain measurement results from signals broadcast from the network (e.g., SS, RS, and BCH) and determine a best or matching RACH group from the plurality of flexibly defined RACH groups based on the measurement results. A response to the signals broadcast from the network (e.g., MSG1) may be transmitted based on the best or matching RACH group.

As will be discussed further below, associations between measurement results and RACH groups may be configured in the random access configuration (e.g. in SI or in UE-specific configuration), in various embodiments. Also, the RACH groups may be defined and/or configured for contention-based random access, contention-free random access and/or both contention-based and contention-free random access. Various exemplary embodiments of parameters that may be used to define RACH groups and/or the associations (e.g., relationships) between individual measurement results and individual RACH groups are numerated below for ease of explanation. Although these exemplary embodiments are separately enumerated, aspects of these exemplary embodiments need not be distinct and may be combined and/or expanded in certain embodiments in view of numerated or non-numerated embodiments.

As a first exemplary embodiment, parameters that may be used to define RACH groups and/or the associations between measurement results and RACH groups may include the number of measurement results. This may include, for example, "beam-level" radio resource management (RRM) measurement results. In some embodiments, this parameter may not be explicitly defined in a configuration.

As a second exemplary embodiment, parameters that may be used to define RACH groups and/or the associations between measurement results and RACH groups may include a MSG1 preamble format. This may include various numbers of "multiple/repeated preambles" within a MSG1 transmission (e.g., the MSG1 preamble may have different configurable formats) where some formats are based on a repetitive structure based on the repetition of the same sequence in some embodiments, or repetition of the same sequence with the different sequences multiplied by either +1 or −1 (e.g., in the form of an orthogonal code), in various embodiments.

As a third exemplary embodiment, parameters that may be used to define RACH groups and/or the associations between measurement results and RACH groups may include the time and frequency resources for MSG1 transmission. For example, this may include the set of all RACH resources available for MSG1 transmission. If "multiple/repeated preamble transmission" is configured, as described above, this may count as one MSG1 occasion.

As a fourth exemplary embodiment, parameters that may be used to define RACH groups and/or the associations between measurement results and RACH groups may include a RACH group period (e.g., after how many MSG1 occasions the same RACH groups are repeated). This may be utilized in quite a large number of embodiments as the basis for a flexible occurrence in time of RACH groups.

For example, one value (e.g., 1) may correspond to the same RACH groups repeating in each MSG1 occasion. This configuration may be useful in applications without BS beam correspondence (e.g., where there is no particular association from measurement result to MSG1 occasion). Other values may correspond to RACH groups occurring in a subset of the MSG1 occasions (e.g., 2 corresponds to the same RACH groups repeated every second MSG1 occasion, 3 corresponds to every third MSG occasion, etc.). Other values and/or periods may be used in other embodiments. RACH groups not repeating in every MSG1 occasion may be useful in the case with BS beam correspondence in an analog beamforming implementation (e.g., with 16 analog beams, such as where measurement results are associated to subsets of MSG1 occasions).

As a fifth exemplary embodiment, parameters that may be used to define RACH groups and/or the associations between measurement results and RACH groups may include the number of RACH groups per MSG1 occasion. In some embodiments, the number of RACH groups per RACH resource may be configured. For example, the RACH groups may be defined by the number of RACH groups per RACH resource. Additionally, the number of RACH resources per MSG1 occasion may be configured in various embodiments.

As a sixth exemplary embodiment, parameters that may be used to define RACH groups and/or the associations between measurement results and RACH groups may include the number of preambles in a RACH group. In some embodiments, the number represents a nominal number of preambles, while the actual number of preambles is adjusted. In some embodiments, the nominal number of preambles is specified in the configuration. In some embodiments, the actual number is specified in the configuration. In various embodiments, the adjustment is a reduction and in some embodiments it's an increase.

In some embodiments, the nominal number of preambles per RACH group is configured, while the actual number is adjusted. For example, this may be according to a predefined rule to match a total number of available preambles. As further examples, this may be with the number of preambles in one of the groups, such as the last group, being adjusted, or with the number of preambles in multiple but not all groups being adjusted, or with the number of preambles in all groups being adjusted, with an equal or unequal amount.

In some embodiments, a nominal number of preambles per RACH group is configured (e.g. for contention-based random access). In some embodiments, an additional parameter is configured which is subtracted from the nominal number to obtain the actual number of preambles per group. In some embodiments, the additional parameter corresponds to the number of preambles reserved for contention-free random access. In various embodiments, it is known by specification which preambles in a nominal RACH group are removed from the actual preambles for contention-based random access as reserved for contention-free random access, based on the additional parameter.

In some embodiments, the actual number of preambles per RACH group is configured (e.g. for contention-based random access). In some embodiments, this configuration results in some of the preambles in RACH resources not being included in the actual RACH groups, as defined through the actual number of preambles (e.g. as used for contention-based random access). In some embodiments, such excluded preambles are used for contention-free random access. In some embodiments, the preambles not included in the actual RACH groups are still included in nominal RACH groups. In some embodiments, where multiple preambles are not included in actual RACH groups (e.g. for contention-based random access), such excluded preambles are configured for contention-free random access and each of the multiple preambles is still part of the nominal RACH groups.

In various embodiments, the number of preambles per RACH group is configured to one. This may be, for example, for contention-free random access.

In various embodiments of contention-free random access configurations, the meaning of the number of preambles in a RACH group is specified by the separation (e.g. in the preamble index space, such as being separated by 8 indices) between different contention-free preambles within a RACH resource. In some embodiments, these different preambles correspond to different RACH groups used for the contention-free random access.

In various embodiments, a configuration for contention-based random access configures preambles that may not be selected (e.g., by being reserved for other purposes). In some embodiments, it is not specified how these preambles are used (e.g., if they are used for contention-free random access or other purposes).

In some embodiments, one or more preambles in a (nominal or actual) RACH group may be are reserved for the request of on-demand SI. In some embodiments, one or more preambles are reserved for the request of on-demand SI in every RACH group. In some embodiments, such preambles are reserved only in a subset of the MSG1 occasions in which the RACH group or RACH groups occur.

As a seventh exemplary embodiment, parameters that may be used to define RACH groups and/or the associations between measurement results and RACH groups may include one or more preamble index offsets. For example, the indices of the preambles in the RACH groups may be shifted by an offset. For example, three RACH groups may contain preambles 2-9, 10-17 and 18-25, respectively, with the index offset 2, instead of containing preambles 0-7, 8-15 and 16-23, respectively. In some embodiments, the a index offset may limit the total number of available preambles in a RACH resource, which may impact the (actual or nominal) number of preambles per RACH group. In some embodiments, one or more preamble index offset(s) is (are) configured to indicate which (one or more) of the preambles not used for contention-based random access is (are) configured for contention-free random access. In some embodiments, the one or more preambles form one or more RACH groups (e.g., with one preamble per RACH group). This may be utilized, for example, for contention-free random access.

As noted above, although these exemplary embodiments are separately enumerated, aspects of these exemplary embodiments need not be distinct and may be combined and/or expanded in certain embodiments in view of numerated or non-numerated embodiments.

Further subdivision of the set of preambles in the RACH groups can be considered in some embodiments (e.g., for the purpose of MSG3 transmission resource size indication, as in LTE). In further embodiments, the MSG3 transmission resource size may be indicated by the parameter q=mod (preamble index, Q), where Q is the number of MSG3 transmission resources sizes, which may be configured in random access configuration (e.g., in SI). For example, with Q=2, even preambles indicate the size represented by q=0 and odd preambles indicate the size represented by q=1. In some embodiments, the actual resource sizes that the different values of q represent are also configurable (e.g., in SI). In some embodiments, the BS employs an algorithm that adapts the resource sizes, such that the different values of q are selected equally often. In other embodiments, the MSG3 transmission resources size is indicated by a subdivision of preamble subsets within the RACH groups. In some embodiments, the preambles groups representing different resource sizes are configured as ratios (e.g., 50% for resource size 0 and 50% for resource size 1, or 25% for resource size 0, 50% for resource size 1 and 25% for resource size 2). The actual number of preambles representing each resource size within a RACH group is then computed (and optionally rounded in a predefined way) from the number of eligible RACH preambles in the RACH group and the ratios.

In various embodiments, the contention-free random access configuration may be based on a configuration for contention-based random access. In some embodiments, a parameter may be configured for contention-free random access that specifies which of the preambles reserved for contention-free random access per RACH group that the UE may use for contention-free random access.

The parameters listed in the third exemplary embodiment, referenced above, may correspond to the physical random access channel (PRACH) or RACH resource configuration in LTE in that they define the available RACH resources. Note that other RACH resources may be available to other UEs based on UE-specific random access configurations, in various embodiments.

The parameters described in the fourth exemplary embodiment and the fifth exemplary embodiment above may define the number of RACH groups (N), which is equal to the number of RACH groups per MSG1 occasion times the number of MSG1 occasions with different RACH groups (e.g., N=E*D, in various embodiments).

Figure 3:
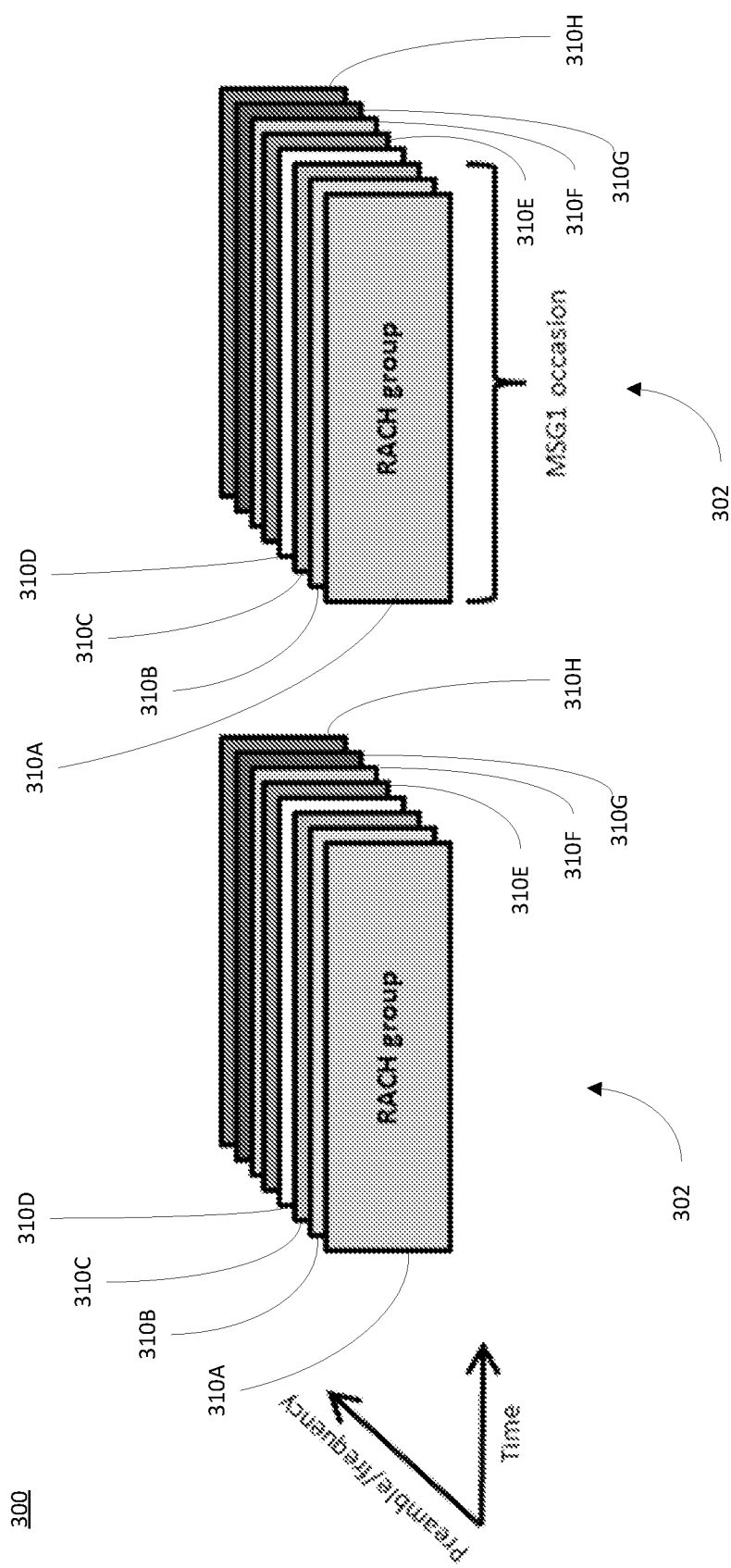
FIG. 3 is a block diagram that illustrates a RACH group configuration where multiple or repeated preambles are transmitted within a MSG1 occasion and same RACH groups are repeated in each MSG1 occasion, in accordance with some embodiments of the present disclosure.

FIG. 3 is a block diagram 300 that illustrates a RACH group configuration where multiple or repeated preambles are transmitted within a MSG1 occasion 302 and same RACH groups are repeated in each MSG1 occasion, in accordance with some embodiments of the present disclosure. The block diagram 300 may include disjoint RACH groups, as a first disjoint RACH group 310A, second disjoint RACH group 310B, third disjoint RACH group 310C, fourth disjoint RACH group 310D, fifth disjoint RACH group 310E, sixth disjoint RACH group 310F, seventh disjoint RACH group 310G, and eight disjoint RACH group 310H. Multiple/repeated preambles (e.g., 4) are transmitted within a MSG1 occasion and the same RACH groups are repeated in each MSG1 occasion. In certain embodiments, the block diagram 300 reflects a case without BS beam correspondence, where the UE can (at least partly) indicate the best DL Tx beam (e.g., a matching DL Tx beam that best matches a particular criteria) by the selection of subset of preambles and/or frequency.

With reference to the second exemplary embodiment (noted above), the block diagram 300 may reflect preamble format that includes multiple/repeated preambles. With reference to the fourth exemplary embodiment (noted above), the block diagram 300 may reflect a RACH group period of one (e.g., RACH groups repeat in every MSG1 occasion). With reference to the fifth exemplary embodiment (noted above), the block diagram 300 may reflect how the number of RACH groups per MSG1 occasion is eight.

Figure 4:
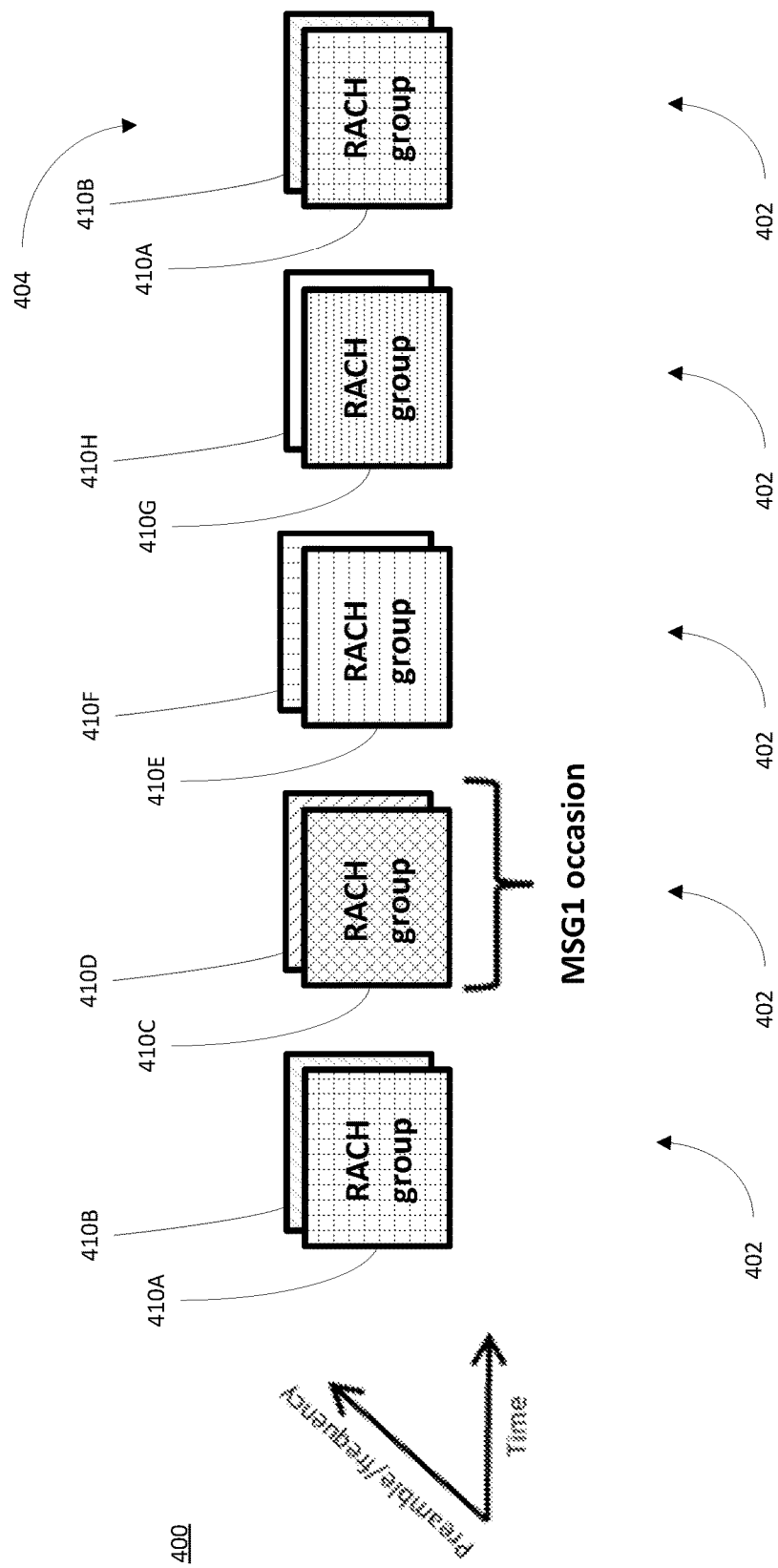
FIG. 4 is a block diagram that illustrates a RACH group configuration where a single preamble is transmitted within a MSG1 occasion and same RACH groups are repeated in every fourth MSG1 occasion, in accordance with some embodiments of the present disclosure.

FIG. 4 is a block diagram 400 that illustrates a RACH group configuration where a single preamble is transmitted within a MSG1 occasion and the same RACH groups are repeated in every fourth MSG1 occasion 404, in accordance with some embodiments of the present disclosure. The block diagram 400 may include disjoint RACH groups, as a first disjoint RACH group 410A, second disjoint RACH group 410B, third disjoint RACH group 410C, fourth disjoint RACH group 410D, fifth disjoint RACH group 410E, sixth disjoint RACH group 410F, seventh disjoint RACH group 410G, and eight disjoint RACH group 410H. In certain embodiments, the block diagram 400 reflects the case with BS beam correspondence, where the UE can (at least partly) indicate the best DL Tx beam by the selection of the MSG1 occasion. By being best, the DL Tx beam may be a matching DL Tx beam that best matches with a particular criteria, as discussed above.

With reference to the second exemplary embodiment (noted above), the block diagram 300 may reflect preamble format that includes a single preamble. With reference to the fourth exemplary embodiment (noted above), the block diagram 300 may reflect a RACH group period of four (e.g., RACH groups repeat in every fourth MSG1 occasion). With reference to the fifth exemplary embodiment (noted above), the block diagram 300 may reflect how the number of RACH groups per MSG1 occasion is two.

For embodiments with beam correspondence and analog/hybrid beamforming, it may be possible to associate DL RS(s) in a time instance (e.g. an SS block) with the RACH groups in a MSG1 occasion. This could be useful in cases with BS beam correspondence, where the BS could use the best (e.g., best criteria matching) DL/UL beam during the MSG1 occasion. For example, let M denote the number of separate time instances during which the A different measurement results have been obtained (e.g. the number of SS blocks per SS burst set), and let Q denote the number of measurement results per such time instance. In other words, typically A=M*Q. By labelling/numbering measurement results and RACH groups, an implicitly defined association rule between the A measurement results and N RACH groups can be defined. Certain examples from various embodiments are discussed further below.

Figure 5:
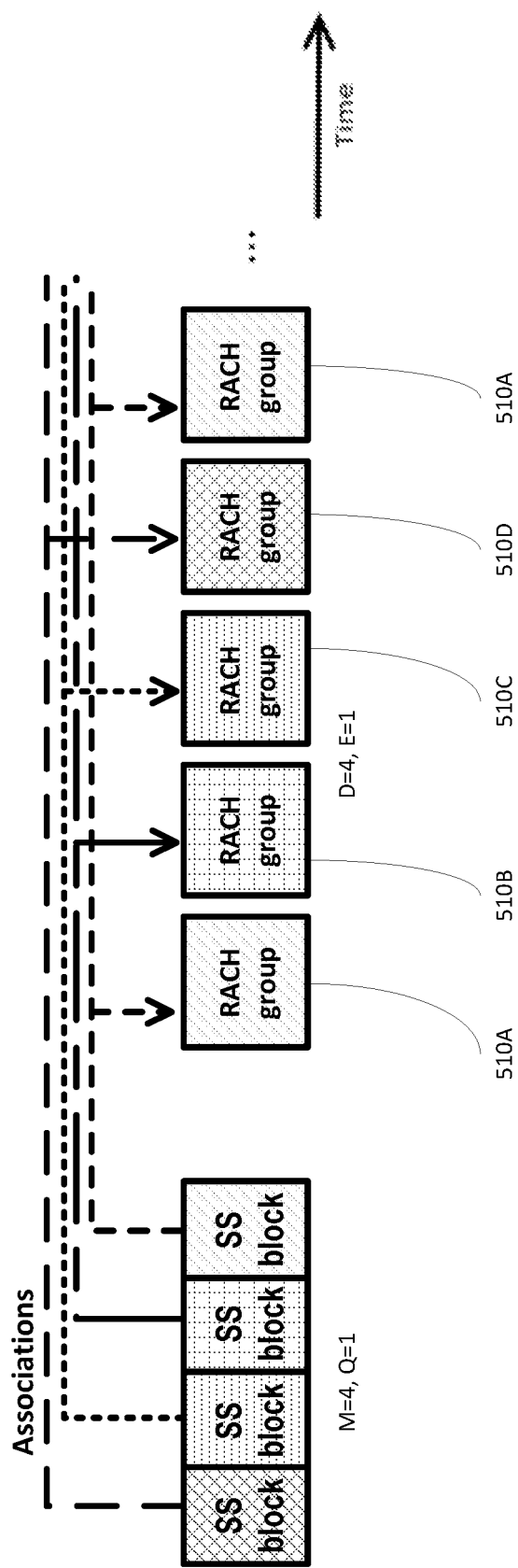
FIG. 5 is a block diagram that illustrates how all measurement results may be associated with disjoint RACH groups such that measurement results from same time instances are uniquely associated to the RACH groups in a same MSG1 occasion, in accordance with some embodiments of the present disclosure.

FIG. 5 is a block diagram 500 that illustrates how all measurement results may be associated with disjoint RACH groups such that measurement results from the same time instances are uniquely associated to the RACH groups in a same MSG1 occasion, in accordance with some embodiments of the present disclosure. Specifically, in block diagram 500, as D=M and E>=Q. Accordingly, the best measurement result (e.g., matching measurement result that best matches with a criteria) can be fully conveyed through the selection of a RACH group. Also, analog beam correspondence may be better exploited due to these unique associations. The block diagram 500 may include disjoint RACH groups, as a first disjoint RACH group 510A, second disjoint RACH group 510B, third disjoint RACH group 510C, and fourth disjoint RACH group 510D. Also, each of the four SS block may be uniquely associated with a respective disjoint RACH group.

Figure 6:
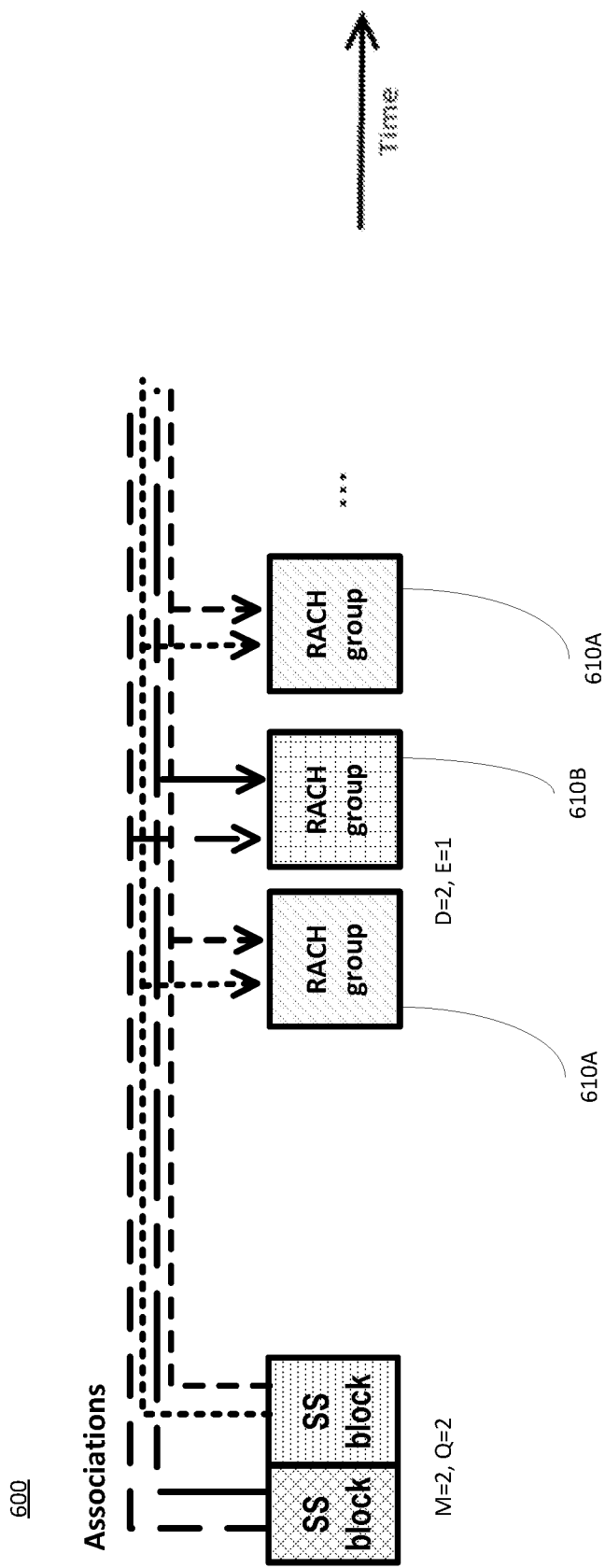
FIG. 6 is a block diagram that illustrates how all measurement results may be associated with disjoint RACH groups such that only the measurement results from the same time instance are associated to the RACH groups in a same MSG1 occasion, in accordance with some embodiments of the present disclosure.

FIG. 6 is a block diagram 600 that illustrates how all measurement results may be associated with disjoint RACH groups such that only the measurement results from the same time instance are associated to the RACH groups in a same MSG1 occasion, in accordance with some embodiments of the present disclosure. Specifically, in block diagram 600, D=M and E<Q. However, multiple measurement results from the same time instance may be associated to a same RACH group. Also, analog beam correspondence may be better exploited due to these associations. The best measurement result (e.g., a matching measurement result that best matches with a particular criteria, as discussed above) may be only partly conveyed through the selection of RACH group if N<A (here, N=2<A=4). The block diagram 600 may include disjoint RACH groups, as a first disjoint RACH group 610A, and a second disjoint RACH group 610B. Also, each of the two SS block may be associated with a respective disjoint RACH group.

Figure 7:
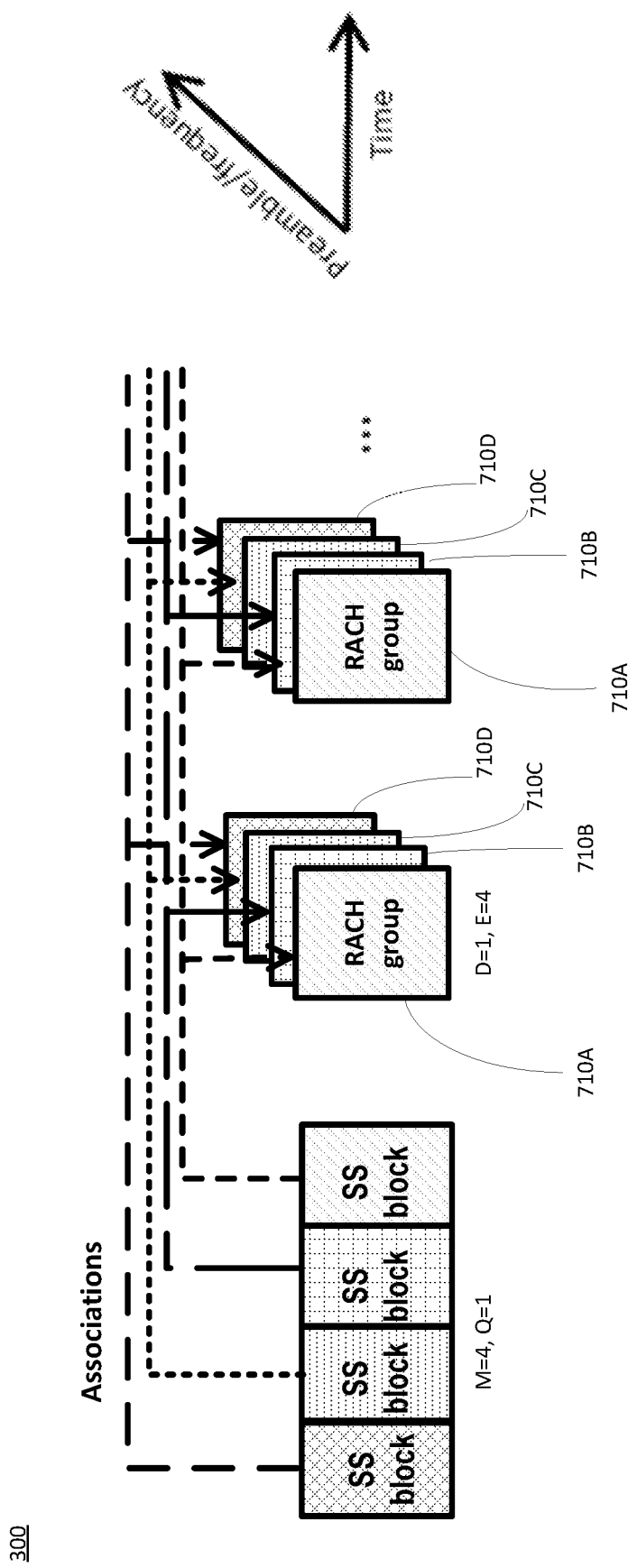
FIG. 7 is a block diagram that illustrates how to fully convey the best or matching measurement result through the selection of a RACH group due to many subsets of preambles or frequency resources in the same MSG1 occasion, in accordance with some embodiments of the present disclosure.

FIG. 7 is a block diagram 700 that illustrates how to fully convey the best or matching measurement result through the selection of a RACH group due to many subsets of preambles or frequency resources in the same MSG1 occasion, in accordance with some embodiments of the present disclosure. Specifically, in block diagram 700, D<M and N=A (Here N=A=4). Accordingly, all measurement results cannot be associated with disjoint RACH groups such that only the measurement results from the same time instance are associated to the RACH groups in the same MSG1 occasion. Instead, measurement results from different time instances may need to be associated with the same MSG1 occasion, which means that it may not be possible to fully exploit analog beamforming. However, it may still be possibly to fully convey the best measurement result through the selection of a RACH group (due to many subsets of preambles or frequency resources in the same MSG1 occasion). The block diagram 700 may include disjoint RACH groups, as a first disjoint RACH group 710A, second disjoint RACH group 710B, third disjoint RACH group 710C, and fourth disjoint RACH group 710D. Also, each of the four SS blocks may be associated with a respective disjoint RACH group.

Figure 8:
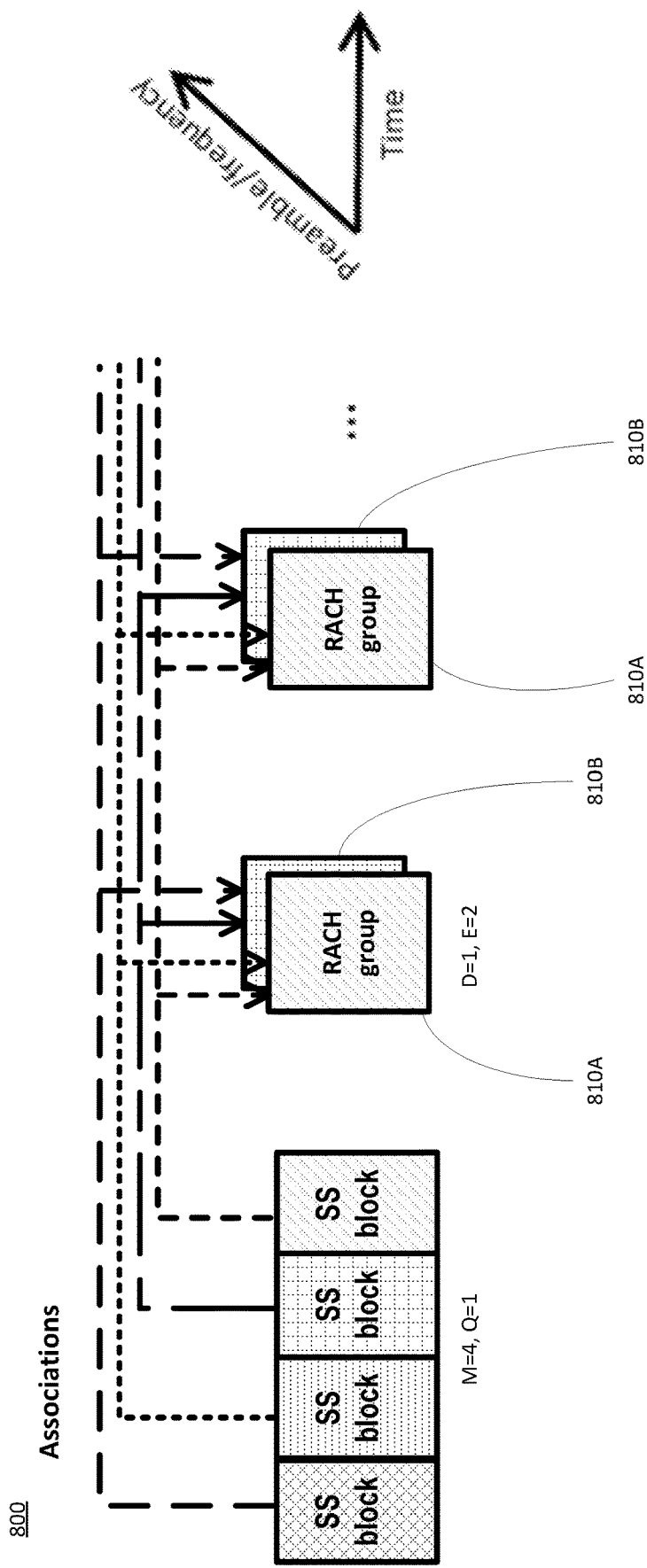
FIG. 8 is a block diagram that illustrates how to partly convey the best or matching measurement result through the selection of a RACH group due to there being too few RACH groups, in accordance with some embodiments of the present disclosure.

FIG. 8 is a block diagram 800 that illustrates how to partly convey the best or matching measurement result through the selection of a RACH group due to there being too few RACH groups, in accordance with some embodiments of the present disclosure. Specifically, in block diagram 800, D<M and N<A (here N=2 and A=4). Accordingly, in certain embodiments, all measurement results cannot be associated with disjoint RACH groups such that only the measurement results from the same time instances are associated to the RACH groups in the same MSG1 occasion. Instead, measurement results from different time instances may be associated with a same MSG1 occasion. This means that it may not be possible to fully exploit analog beamforming. Furthermore, it may be possible to partly convey the best measurement result through the selection of a RACH group (e.g., due to there being too few RACH groups). The block diagram 800 may include disjoint RACH groups, as a first disjoint RACH group 810A and second disjoint RACH group 810B. Also, each of the four SS blocks may be associated with a disjoint RACH group.

In certain embodiments, as far as possible (e.g., depending on the parameters A, D, E, M, N, Q), the measurements from the same time instance may be associated with RACH groups in the same MSG1 occasion. If the index of the best or matching measurement result (e.g., matching measurement result that best matches with a criteria, as discussed above) is only partly conveyed through the selection of RACH group, then the remaining part can be conveyed in MSG3.

Various UE side embodiments may be discussed in further detail below. In various embodiments, a UE (e.g., an IDLE UE) may receive the random access configuration, as described above (e.g., in a broadcasted SI). Stated another way, the UE may receive broadcasted signals from a network (e.g., a BS) that may include synchronization signal(s) (SS), reference signal(s) (RS), and broadcast channel(s) (BCH) that each carry system information (SI). The UE may extracts the parameters related to RACH group definitions. Based on the parameter values and the predefined (e.g. specified) rules, the UE may deduces the RACH groups and the association between measurement results and RACH groups. Stated another way, parameters may be utilized in accordance with rules to construct (e.g., realize) the available RACH groups and/or the associations between the RACH groups and measured signals. Based on the best measurement result (e.g., a matching measurement result that best matches a criteria), the UE may select the associated RACH group. If the RACH group contains multiple preambles, the UE may select a preamble from the RACH group. Such selections may be as appropriate to identify the best or matching measurement result. The UE may transmit the selected preamble on a RACH resource belonging to the RACH group.

In various embodiments, a UE may receive a random access configuration, including a configuration for contention-free random access (e.g., in a UE-specific random access configuration). The configuration may include parameters, as discussed above, with which the UE can deduce (e.g., using predefined or specified, rules) the one or more preambles that the UE may use for contention-free random access. In some embodiments, the UE may be configured with multiple RACH groups for contention-free random access. In various embodiments, such a RACH group may include a single preamble. In other embodiments, such a RACH group may include multiple preambles. In some embodiments, the multiple RACH groups (e.g., with a single preamble) may include the same preamble, but disjoint sets of RACH resources. In some embodiments some RACH groups (e.g., with a single preamble) may use non-disjoint sets of RACH resources, but different preambles. This means that a UE may be configured with multiple preambles (e.g., each belonging to a different RACH group) within the same RACH resource for contention-free random access. In various embodiments, a UE configured with contention-free random access selects a RACH group (e.g., with a single preamble) based on measurement results. In some embodiments, (e.g., when the RACH group contains a single preamble) the selection of a RACH group also results in the selection of a single preamble and subset of RACH resources. In some embodiments, different RACH groups (e.g., for contention-free random access) may correspond to the same subset of RACH resources, but different preambles. In some embodiments, (e.g., for contention-free random access) different RACH groups may correspond to the same preamble, but disjoint subsets of RACH resources.

In some embodiments, a UE may first receive a common random access configuration, as described above, in a broadcasted SI, and then secondly receive a UE-specific random access configuration. In various embodiments, as also described above, the UE-specific random access configuration (e.g., for contention-free random access) may be based on the firstly received common random access configuration, and/or may configure RACH groups for contention-free random access in the UE-specific configuration based on parameters obtained in the firstly received common random access configuration.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a communication device, the method comprising:
   determining, based on at least one parameter for communication with a communication node:
      a plurality of random access channel (RACH) groups, and
      a relationship between an individual RACH group of the plurality of RACH groups and a plurality of signals, wherein each individual RACH group of the plurality of RACH groups comprises at least one RACH resource and at least one RACH preamble, and the at least one parameter indicates a number of preambles in each individual RACH group and a number of RACH groups per RACH occasion, wherein each RACH occasion corresponds to a time instance in which a RACH preamble may be transmitted and wherein each individual RACH group of the plurality of RACH groups is determined based on a RACH group period;
   obtaining measurement results from the plurality of signals, wherein the plurality of signals comprises at least one synchronization signal (SS) block;
   determining a matching RACH group from the plurality of RACH groups based on the measurement results;
   sending a message using at least one resource of the matching RACH group to the communication node.

2. The method of claim 1, wherein the at least one parameter is obtained from the plurality of signals.

3. The method of claim 1, wherein the at least one parameter further indicates a quantity of the measurement results.

4. The method of claim 1, wherein the at least one parameter further indicates a number of preambles associated with the plurality of RACH groups.

5. The method of claim 1, wherein the at least one parameter further indicates a set of all RACH resources that may be utilized for sending the message.

6. The method of claim 1, wherein a plurality of preambles in each RACH group is reserved for a request of on-demand system information (SI) or is reserved for the request of on demand SI in every RACH group, or is reserved only in a subset of MSG1 occasions in which the RACH group or RACH groups occur.

7. The method of claim 1, further comprising determining the matching RACH group from the plurality of RACH groups based on the measurement results in accordance with a criteria.

8. The method of claim 7, wherein the criteria is one of: a greatest reference signal received power (RSRP), a greatest reference signal received quality (RSRQ), and a greatest signal to noise and interference power ratio (SINR).

9. The method of claim 1, wherein the plurality of signals further comprises at least one of SS bursts, SS burst sets, reference signals, or a broadcast channel carrying system information.

10. A method performed by a communication node, the method comprising:
   determining at least one parameter for communication with a communication device, wherein the at least one parameter indicates:
      a plurality of random access channel (RACH) groups, and
      a relationship between an individual RACH group of the plurality of RACH groups and a plurality of signals from which measurement results are obtained by the communication device, wherein each individual RACH group of the plurality of RACH groups comprises at least one RACH resource and at least one RACH preamble, and the at least one parameter indicates a number of preambles in each individual RACH group and a number of RACH groups per RACH occasion, wherein each RACH occasion corresponds to a time instance in which a RACH preamble may be transmitted and wherein each individual RACH group of the plurality of RACH groups is determined based on a RACH group period;

transmitting the plurality of signals to the communication device, wherein the plurality of signals comprises at least one synchronization signal (SS) block;

receiving a message on at least one resource of a matching RACH group of the plurality of RACH groups from the communication device.

11. The method of claim 10, wherein the at least one parameter is transmitted in at least one of the plurality of signals.

12. The method of claim 10, wherein the at least one parameter further indicates a quantity of the measurement results.

13. The method of claim 10, wherein the at least one parameter further indicates a number of preambles associated with the plurality of RACH groups.

14. The method of claim 10, wherein the at least one parameter further indicates a set of all RACH resources that may be utilized for receiving the first message.

15. The method of claim 10, wherein a plurality of preambles in each RACH group is reserved for a request of on-demand system information (SI) or is reserved for the request of on demand SI in every RACH group, or is reserved only in a subset of MSG1 occasions in which the RACH group or RACH groups occur.

16. A communication device, comprising:
at least one processor configured to:
determine, based on at least one parameter for communication with a communication node:
a plurality of random access channel (RACH) groups, and
a relationship between an individual RACH group of the plurality of RACH groups and a plurality of signals, wherein each individual RACH group of the plurality of RACH groups comprises at least one RACH resource and at least one RACH preamble, and the at least one parameter indicates a number of preambles in each individual RACH group and a number of RACH groups per RACH occasion, wherein each RACH occasion corresponds to a time instance in which a RACH preamble may be transmitted and wherein each individual RACH group of the plurality of RACH groups is determined based on a RACH group period;
obtain measurement results from the plurality of signals, wherein the plurality of signals comprises at least one synchronization signal (SS) block;
determine a matching RACH group from the plurality of RACH groups based on the measurement results; and
a transmitter configured to send a message using at least one resource of the matching RACH group to the communication node.

17. The communication device of claim 16, wherein the at least one parameter is obtained from the plurality of signals.

18. The communication device of claim 16, wherein the at least one parameter further indicates a quantity of the measurement results.

19. The communication device of claim 16, wherein the at least one parameter further indicates a number of preambles associated with the plurality of RACH groups.

20. The communication device of claim 16, wherein the at least one parameter further indicates a set of all RACH resources that may be utilized for sending the message.

21. The communication device of claim 16, wherein a plurality of preambles in each RACH group is reserved for a request of on-demand system information (SI) or is reserved for the request of on demand SI in every RACH group, or is reserved only in a subset of MSG1 occasions in which the RACH group or RACH groups occur.

22. The communication device of claim 16, further comprising determining the matching RACH group from the plurality of RACH groups based on the measurement results in accordance with a criteria.

23. The communication device of claim 22, wherein the criteria is one of: a greatest reference signal received power (RSRP), a greatest reference signal received quality (RSRQ), and a greatest signal to noise and interference power ratio (SINR).

24. The communication device of claim 16, wherein the plurality of signals further comprises at least one of SS bursts, SS burst sets, reference signals, or a broadcast channel carrying system information.

25. A communication node, comprising:
at least one processor configured to:
determine at least one parameter for communication with a communication device, wherein the at least one parameter indicates:
a plurality of random access channel (RACH) groups, and
a relationship between an individual RACH group of the plurality of RACH groups and a plurality of signals from which measurement results are obtained by the communication device, wherein each individual RACH group of the plurality of RACH groups comprises at least one RACH resource and at least one RACH preamble, and the at least one parameter indicates a number of preambles in each individual RACH group and a number of RACH groups per RACH occasion wherein each RACH occasion corresponds to a time instance in which a RACH preamble may be transmitted and wherein each individual RACH group of the plurality of RACH groups is determined based on a RACH group period;
a transmitter configured to transmit the plurality of signals to the communication device, wherein the plurality of signals comprises at least one synchronization signal (SS) block; and
a receiver configured to receive a message on at least one resource of a matching RACH group of the plurality of RACH groups from the communication device.

26. The communication device of claim 25, wherein the at least one parameter is transmitted in at least one of the plurality of signals.

27. The communication device of claim 25, wherein the at least one parameter further indicates a quantity of the measurement results.

28. The communication device of claim 25, wherein the at least one parameter further indicates a number of preambles associated with the plurality of RACH groups.

29. The communication device of claim 25, wherein the at least one parameter further indicates a set of all RACH resources that may be utilized for receiving the message.

30. The communication device of claim 25, wherein a plurality of preambles in each RACH group is reserved for a request of on-demand system information (SI) or is reserved for the request of on demand SI in every RACH group, or is reserved only in a subset of MSG1 occasions in which the RACH group or RACH groups occur.

* * * * *